United States Patent
Kenefick et al.

(10) Patent No.: US 7,945,497 B2
(45) Date of Patent: May 17, 2011

(54) SYSTEM AND METHOD FOR UTILIZING INTERRELATED COMPUTERIZED PREDICTIVE MODELS

(75) Inventors: Timothy P. Kenefick, South Windsor, CT (US); Eric Besman, Manchester, CT (US); Theresa C. Murphy, Colchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 622 days.

(21) Appl. No.: 11/961,380

(22) Filed: Dec. 20, 2007

(65) Prior Publication Data

US 2008/0154651 A1    Jun. 26, 2008

Related U.S. Application Data

(60) Provisional application No. 60/876,684, filed on Dec. 22, 2006.

(51) Int. Cl.
 *G06Q 40/10* (2006.01)
(52) U.S. Cl. ............................................. 705/35; 705/4
(58) Field of Classification Search .................... 705/35, 705/4
See application file for complete search history.

(56) References Cited

U.S. PATENT DOCUMENTS

| | | |
|---|---|---|
| 5,613,072 A | 3/1997 | Hammond et al. |
| 5,712,984 A | 1/1998 | Hammond et al. |
| 5,796,932 A | 8/1998 | Fox et al. |
| 5,926,800 A | 7/1999 | Baronowski et al. |
| 5,950,150 A | 9/1999 | Lloyd et al. |
| 5,970,464 A | 10/1999 | Apte et al. |
| 6,014,632 A | 1/2000 | Gamble et al. |
| 6,067,488 A | 5/2000 | Tano |
| 6,078,857 A | 6/2000 | Jung et al. |
| 6,112,225 A | 8/2000 | Kraft et al. |
| 6,154,658 A | 11/2000 | Caci |
| 6,163,770 A | 12/2000 | Gamble et al. |
| 6,204,757 B1 | 3/2001 | Evans et al. |
| 6,246,934 B1 | 6/2001 | Otake et al. |
| 6,438,547 B1 | 8/2002 | Mehr et al. |
| 6,594,579 B1 | 7/2003 | Lowrey et al. |

(Continued)

FOREIGN PATENT DOCUMENTS

WO    WO-01/13295 A1    2/2001

OTHER PUBLICATIONS

Weizhong Yan, "Designing a Neural Network Decision System for Automated Insurance Underwriting," Int'l Joint Conference on Neural Networks, Jul. 2006, pp. 1-8.*

(Continued)

*Primary Examiner* — Kirsten S Apple
*Assistant Examiner* — Abdul Basit
(74) *Attorney, Agent, or Firm* — Ropes & Gray LLP

(57) ABSTRACT

The invention relates to a system for handling insurance requests, such as new coverage applications, renewal applications, and insurance quote requests. The system includes at least two computerized predictive models whose outputs each serve as inputs to the other. A business logic module is included in the system to process insurance requests with the predictive models to determine one or more sets of recommended policy parameters for the user and to output the determination to the user via a user interface. In various embodiments, the predictive models also output workflow components (such as underwriting workflow components) and price components (such as premium prices) corresponding to output suggested sets of coverage parameters.

28 Claims, 7 Drawing Sheets

U.S. PATENT DOCUMENTS

| | | |
|---|---|---|
| 6,611,740 B2 | 8/2003 | Lowrey et al. |
| 6,643,578 B2 | 11/2003 | Levine |
| 6,710,738 B2 | 3/2004 | Allen, Jr. |
| 6,756,915 B2 | 6/2004 | Choi |
| 6,768,417 B2 | 7/2004 | Kuragaki et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,917,952 B1 | 7/2005 | Dailey et al. |
| 6,920,379 B2 | 7/2005 | Miyamoto |
| 6,925,425 B2 | 8/2005 | Remboski et al. |
| 6,957,133 B1 | 10/2005 | Hunt et al. |
| 6,959,296 B1 | 10/2005 | Reiss |
| 6,965,326 B2 | 11/2005 | Allison |
| 6,973,319 B2 | 12/2005 | Ormson |
| 6,977,612 B1 | 12/2005 | Bennett |
| 6,985,922 B1 | 1/2006 | Bashen et al. |
| 7,007,245 B2 | 2/2006 | D'Souza et al. |
| 7,039,592 B1 | 5/2006 | Yegge et al. |
| 7,072,841 B1 | 7/2006 | Pednault |
| 7,215,255 B2 | 5/2007 | Grush |
| 7,702,615 B1 * | 4/2010 | Delurgio et al. .............. 705/10 |
| 2001/0020229 A1 | 9/2001 | Lash |
| 2002/0010598 A1 | 1/2002 | Johnson et al. |
| 2002/0072958 A1 | 6/2002 | Yuyama et al. |
| 2002/0099596 A1 | 7/2002 | Geraghty |
| 2002/0147617 A1 | 10/2002 | Schoenbaum et al. |
| 2002/0161609 A1 | 10/2002 | Zizzamia et al. |
| 2002/0173885 A1 | 11/2002 | Lowrey et al. |
| 2002/0194113 A1 | 12/2002 | Lof et al. |
| 2002/0198801 A1 | 12/2002 | Dixon et al. |
| 2003/0028406 A1 | 2/2003 | Herz et al. |
| 2003/0061075 A1 | 3/2003 | Heckman et al. |
| 2003/0097330 A1 | 5/2003 | Hillmer et al. |
| 2003/0101080 A1 | 5/2003 | Zizzamia et al. |
| 2003/0105651 A1 | 6/2003 | Gendelman |
| 2003/0167191 A1 * | 9/2003 | Slabonik et al. .............. 705/4 |
| 2003/0171956 A1 | 9/2003 | Cox et al. |
| 2004/0103002 A1 | 5/2004 | Colley et al. |
| 2004/0128147 A1 | 7/2004 | Vallinayagam et al. |
| 2004/0133439 A1 | 7/2004 | Noetzold et al. |
| 2004/0138927 A1 | 7/2004 | Eydeland et al. |
| 2004/0153362 A1 | 8/2004 | Bauer et al. |
| 2004/0186753 A1 | 9/2004 | Kim et al. |
| 2004/0199410 A1 | 10/2004 | Feyen et al. |
| 2004/0220784 A1 | 11/2004 | Stephenson et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0220840 A1 | 11/2004 | Bonissone et al. |
| 2004/0230459 A1 | 11/2004 | Dordick et al. |
| 2004/0236611 A1 | 11/2004 | Bonissone et al. |
| 2004/0236676 A1 | 11/2004 | Takezawa et al. |
| 2004/0249557 A1 | 12/2004 | Harrington et al. |
| 2004/0249679 A1 | 12/2004 | Henderson et al. |
| 2005/0055248 A1 | 3/2005 | Helitzer et al. |
| 2005/0055249 A1 | 3/2005 | Helitzer et al. |
| 2005/0060141 A1 | 3/2005 | Suzuki et al. |
| 2005/0060207 A1 | 3/2005 | Weidner et al. |
| 2005/0070299 A1 | 3/2005 | Caspi et al. |
| 2005/0091080 A1 | 4/2005 | Biats |
| 2005/0091085 A1 | 4/2005 | Colley et al. |
| 2005/0108063 A1 | 5/2005 | Madill et al. |
| 2005/0108066 A1 | 5/2005 | Weidner et al. |
| 2005/0125213 A1 * | 6/2005 | Chen et al. .............. 703/22 |
| 2005/0125259 A1 | 6/2005 | Annappindi |
| 2005/0131742 A1 | 6/2005 | Hoffman et al. |
| 2005/0137912 A1 | 6/2005 | Rao et al. |
| 2005/0171885 A1 | 8/2005 | Christman et al. |
| 2005/0192850 A1 | 9/2005 | Lorenz |
| 2005/0203828 A1 * | 9/2005 | Lyakovetsky .............. 705/38 |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0240451 A1 | 10/2005 | Johnson et al. |
| 2005/0262039 A1 * | 11/2005 | Kreulen et al. .............. 707/1 |
| 2005/0276401 A1 | 12/2005 | Madill et al. |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0053038 A1 | 3/2006 | Warren et al. |
| 2006/0064332 A1 | 3/2006 | Schoenbaum et al. |
| 2006/0136273 A1 | 6/2006 | Zizzamia et al. |
| 2006/0187889 A1 | 8/2006 | Mehta et al. |
| 2006/0242046 A1 | 10/2006 | Haggerty et al. |
| 2006/0259333 A1 | 11/2006 | Pyburn |
| 2006/0287892 A1 | 12/2006 | Jones et al. |
| 2007/0016500 A1 | 1/2007 | Chatterji et al. |
| 2007/0016508 A1 | 1/2007 | Lapointe et al. |
| 2007/0016542 A1 * | 1/2007 | Rosauer et al. .............. 706/21 |
| 2007/0021987 A1 | 1/2007 | Binns et al. |
| 2007/0027725 A1 | 2/2007 | Dirnberger et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0100669 A1 | 5/2007 | Wargin et al. |
| 2007/0106539 A1 | 5/2007 | Gay |
| 2007/0118399 A1 * | 5/2007 | Avinash et al. .............. 705/2 |
| 2008/0040676 A1 * | 2/2008 | Garg et al. .............. 715/762 |
| 2008/0126138 A1 * | 5/2008 | Cherney et al. .............. 705/4 |
| 2008/0236177 A1 * | 10/2008 | Senba et al. .............. 62/157 |

OTHER PUBLICATIONS

D'Arcy, Stephen P. Paper presented at World Risk and Insurance Economics Congress. Predictive Modeling in Automobile Insurance: A Preliminary Analysis. (2005).

Derrig et al. Comparison of Methods and Software for Modeling Nonlinear Dependencies: A Fraud Application. (2006).

Grimes, Seth. The Word on Text Mining. Presentation. Portals, Collaboration, and Content Management. (Apr. 14, 2005).

Pednault et al. IBM Research Report RC-21757. The Importance of Estimation Errors in Cost-Sensitive Learning. (May 30, 2000).

Rosenberg et al. Predictive Modeling with Longitudinal Data: A Case Study of Wisconsin Nursing Homes. (Feb. 4, 2006).

Hong, S.J. et al. IBM Research Report RC-21570. Advances in Predictive Model Generation for Data Mining. (1999).

Woodfield, Terry J. Paper 071-30. Predicting Workers' Compensation Insurance Fraud Using SAS® Enterprise Miner™ 5.1 and SAS® Text Miner. 2004.

Pednault et al. IBM Research Report RC-21731. Handling Imbalanced Data Sets in Insurance Risk Modeling. (Mar. 10, 2000).

Axelrod et al. Predictive Modeling in Health Plans. Abstract from Disease Management & Health Outcomes, 11:779-87(9). (Nov. 2003).

Wu et al. Paper. Casualty Actuarial Society Forum. pp. 113-138. Does Credit Score Really Explain Insurance Losses? Multivariate Analysis from a Data Mining Point of View. 2003.

Conger et al. Emphasis Apr. 2006. Predictive Modeling in Workers Compensation. pp. 18-21.

Apte et al. Data-intensive analytics for predictive modeling. IBM Journal of Research and Development. 47:1, 17-23 (Jan. 2003).

Apte et al. A probabilistic estimation framework for predictive modeling analytics. IBM Systems Journal. 41:3, 438-48. (2002).

Magnify Press Release. Magnify Applies Predictive Modeling to Worker's Comp Underwriting and Fraud Detection. Chicago, IL (Mar. 1, 2005).

Mosley, R. The Use of Predictive Modeling in the Insurance Industry. Pinnacle Actuarial Resources Inc. (Jan. 2005).

Guszcza et al. Predictive Modeling for Property-Casualty Insurance. Presentation to SoCal Actuarial Club. (Sep. 22, 2004).

Ellingsworth et al. DM Review. Text Mining Improves Business Intelligence and Predictive Modeling in Insurance. (Jul. 2003).

Magnify Press Release. Erie Insurance Reduces Fraud Losses with FraudFocus™. Predictive Modeling Demonstrates Effectiveness for Auto, Property and Worker's Comp. (Feb. 4, 2005).

Table of Contents of White Paper. Predictive Modeling in Insurance: An insurance industry executive briefing. SAS (Predictive Modeling in Insurance), publisher. (Mar. 23, 2007).

Guven, Serhat. Predictive Modeling. Future Fellows. (Jun. 2006).

Predictive Modeling. Record, 28:2. Spring Meeting, San Francisco, CA. Session 99OF. (Jun. 2002).

Antonio et al. North American Actuarial Journal. 10:1, 30-48. Lognormal Mixed Models for Reported Claims Reserves. (Jan. 2006).

Young, Virginia R. Actuarial Research Clearing House. vol. 1. Robust Bayesian Credibility Using Semiparametric Models. (1999).

Macleod et al. Paper. Entropy-Reducing Properties of Predictive Financial Models. Aug. 27, 1992. Actuarial Research Clearing House. vol. 3 (1993).

Morgan et al. Conjugate Bayesian Analysis of the Negative Binomial Distribution. Actuarial Research Clearing House. vol. 1, pp. 97-118, (1993).

Sharp, Keith P. Aspects of Interest Rate Models. Actuarial Research Clearing House. vol. 1, pp. 433-457. (Aug. 25, 1990).

Roudebush et al. Converting Clinical Literature to an Insured Population: A Comparison of Models Using Nhanes. No. Ameri. Actuarial J. 6:4, 55-66 (2002).

Fellingham et al. Comparing Credibility Estimates of Health Insurance Claims Costs. No. Ameri. Actuarial J. 9:1, 1-12. (2005).

de Alba, Enrique. Bayesian Estimation of Outstanding Claims Reserves. No. Ameri. Actuarial J. 6:4, 1-20. (2002).

Ellis et al. Applying Diagnosis-Based Predictive Models to Group Underwriting. Society of Actuaries, Issue 46, 1-7. (Aug. 2003).

Wolak, Dan. An Actuarial Response to the Health-Care Crisis. Society of Actuaries. Issue 47, 1-9. (Apr. 2004).

Werner et al. GLM Basic Modeling: Avoiding Common Pitfalls. Casualty Actuarial Society Forum. pp. 257-272. (Winter 2007).

Meyers, Glenn. On Predictive Modeling for Claim Severity. Casualty Actuarial Society Forum. pp. 215-253. (Spring 2005).

CAS Data Management and Information Educational Materials Working Party. Survey of Data Management and Data Quality Texts. Casualty Actuarial Society Forum, pp. 273-306. (Winter 2007).

Sanche et al. Variable Reduction for Predictive Modeling with Clustering. Casualty Actuarial Society Forum, pp. 89-100. (Winter 2006).

Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).

Predictive Modeling Raises Opportunities and Issues for Actuaries and Insurers, CAS Annual Meeting is Told. Insurance Newscast (Dec. 15, 2005).

Wang, Wei. Predictive Modeling Based on Classification and Pattern Matching Methods. Thesis. (May 1999).

Bolstad, W. M. Introduction to Bayesian Statistics. A. John Wiley & Sons Inc. 2nd ed. 2007.

de Ville, Barry. Decision Trees for Business Intelligence and Data Mining Using SAS Enterprise Miner. SAS Press Series. 2006.

Deloitte & Touche. Presentation Predictive Modeling for Claims: The New Claim Frontier (2006).

Fetterolf, Don. Paradise Lost: Return on Investment in Disease Management. Health Watch. Issue 52, pp. 14-17. (May 2006).

Monsour, Christopher. Presentation: Discrete Predictive Modeling. Casualty Actuarial Society. Special Interest Seminar on Predictive Modeling. (Oct. 5, 2004).

Monsour, Christopher. Presentation: What is Predictive Modeling? (2005).

Predictive Modeling Applications. Weyuker, L. & Minnich, J. Record, 31:2. New Orleans Health/Pension Spring Meeting, Session 3PD. (Jun. 2005).

Predictive Modeling-Current Practices and Future Applications. Record, 30:1. Spring Meeting, Anaheim, CA. Session 64PD. (May 2004).

Roberts, Jack. Risk & Insurance. Fighting CAT risk creep. 18:8, p. 26(2). (2007).

Steed, Judy. Winning Ways. Toronto Star, p. 3-4 (May 21, 2007).

Stehno, Chris E. What We Have Learned in the Last 50 Years-and Aren't Using. Health Watch. Issue 52, pp. 18-21. (May 2006).

Woodley et al. Assessing Predictive Modeling Tools for Pricing and Underwriting. Health Watch. Issue 51, pp. 30-33. (Jan. 2006).

* cited by examiner

SYSTEM AND METHOD FOR UTILIZING INTERRELATED COMPUTERIZED PREDICTIVE MODELS

CROSS-REFERENCE RELATED APPLICATION

This application claims the benefit of U.S. Provisional Application Ser. No. 60/876,684, filed Dec. 22, 2006, the entire contents of which are incorporated herein by reference.

FIELD OF THE INVENTION

In general, the invention relates to the field of computerized predictive models and their use for intelligent decision making. More specifically, the invention relates to predictive models in which outputs of predictive models serve as inputs to one another to form a predictive feedback loop and methods for using such models.

BACKGROUND OF THE INVENTION

Effectively identifying appropriate insurance coverages for a particular customer requires skill and experience developed over years of practice. Those having such skill are limited in number and thus provide only limited bandwidth to insurers. These limitations make it difficult for a customer to obtain coverage guidance in a real-time fashion on demand. Thus, a need exists in the art for a computerized system capable of identifying appropriate coverages for customers with reduced need for expert human interaction.

Moreover, many requests for insurance are relatively routine. Expending underwriter energy on evaluating such requests presents a burden on insurance companies with limited underwriting bandwidth and slows the process for customers of obtaining insurance and insurance quotes. Thus, a need exists in the art for a system to identify insurance requests that can be handled with no or reduced human underwriter involvement.

SUMMARY OF THE INVENTION

Accordingly, in one aspect, the invention relates to a system for handling insurance requests, such as new coverage applications, renewal applications, and insurance quote requests. The system includes a user interface for accepting data related to an insurance request from a user. The system also includes at least two computerized predictive models whose outputs each serve as inputs to the other. A business logic module is included in the system to process the accepted data by the predictive models to determine one or more sets of recommended policy parameters for the user and to output the determination to the user via the user interface. In various embodiments, the predictive models also output workflow components (such as underwriting workflow components) and price components (such as premium prices) corresponding to output suggested sets of coverage parameters.

In one embodiment, the system includes a data capture module that extracts input parameters from a variety of data sources for the predictive models. Suitable data sources include third party data sources, providers of telematics data, and unstructured text, which can be mined using a text mining engine and/or an information extraction engine.

In another embodiment, the business logic module of the system includes a rule engine configured to identify parameters for computerized predictive models for which additional data would improve their performance. The identified parameters are then output to the data capture module and/or the user interface.

According to another aspect, the invention relates to a method for handling an insurance request. The method includes accepting data related to an insurance request from a user via a user interface. A business logic module then processes the accepted data to determine a recommended set of policy parameters for an insured by executing first and second predictive models based on the accepted data. At least one output of the first predictive model serves as an input parameter to the second computerized predictive model and at least one output of the second computerized predictive model serves as an input to the first computerized model. The method also includes outputting, by the business logic module, the recommended set of policy parameters to the user via the user interface.

According to a third aspect, the invention relates to a computer readable medium storing computer readable instructions, which, when executed by a processor, cause the processor to carry out the method and system functionality described above.

BRIEF DESCRIPTION OF THE DRAWINGS

The foregoing discussion will be understood more readily from the following detailed description of the invention with reference to the following figures.

DETAILED DESCRIPTION OF AN ILLUSTRATIVE EMBODIMENT

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
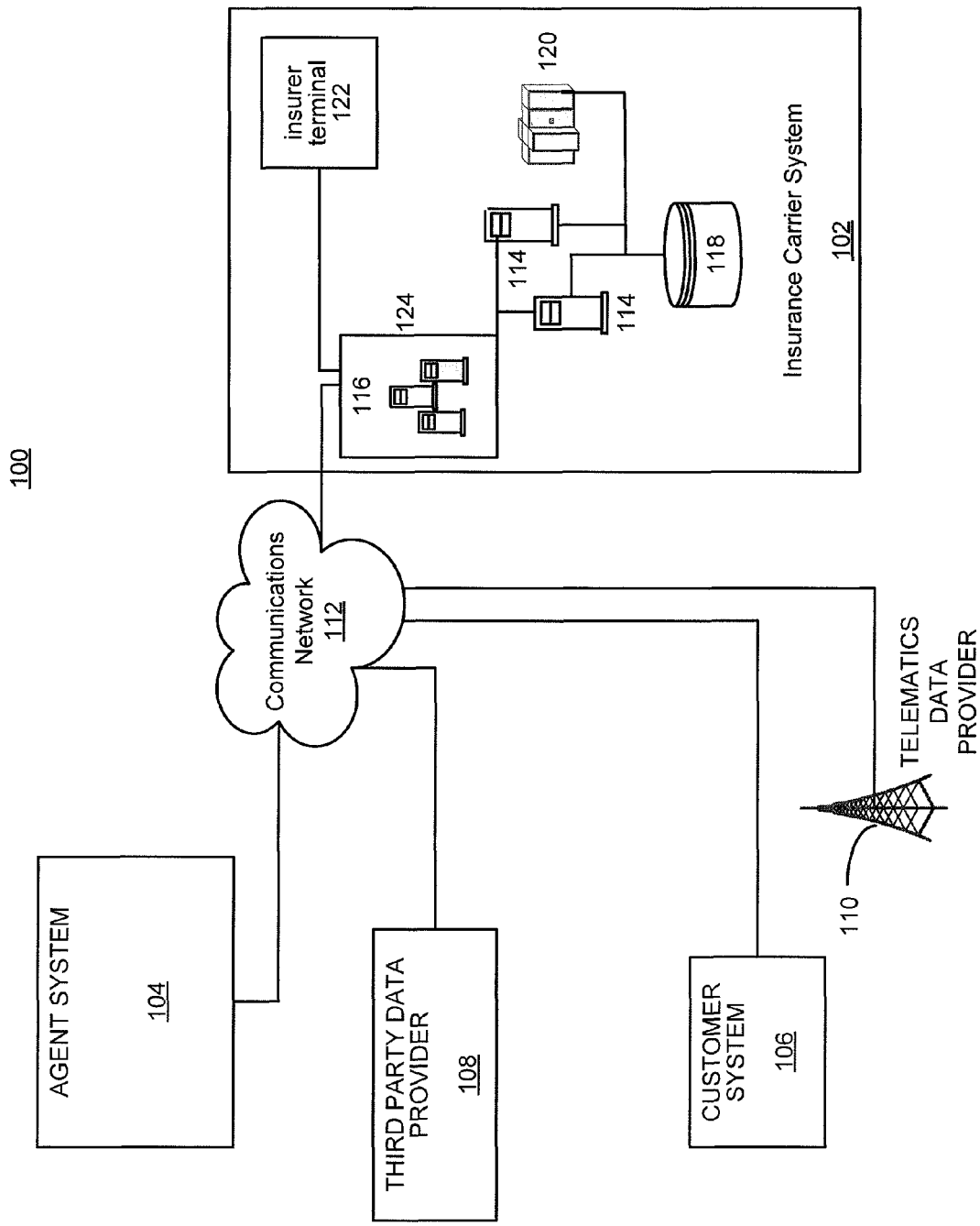
FIG. 1 is a block diagram of a system for processing insurance requests, according to an illustrative embodiment of the invention.

FIG. 1 is a block diagram of a system 100 for processing insurance requests, according to an illustrative embodiment of the invention. The term "insurance request", as used herein, shall refer to a request from an insurance customer or an insurance agent for an insurance quote, a new insurance policy, or a renewal insurance policy. The insurance customer may be an individual seeking personal lines insurance (e.g., life insurance, home owners insurance, automobile insurance) or a business seeking commercial insurance coverage (e.g., property and casualty insurance, umbrella insurance policies, directors and officers insurance, etc.), medical insurance, and/or workers compensation insurance. In particular, the methods and systems described herein are particularly well suited for, but are not limited to, handling the insurance needs of small businesses.

System 100 includes an insurance carrier system 102 in communication with user systems 104 and 106 and data sources 108 and 110. User system 104 is an agent system operated by an insurance agent. User system 106 is a customer system operated by an insurance customer. Data sources 108 are third party sources of data, including, for example, government entities (such as departments of motor vehicles, federal and state census bureaus, and meteorological services), private data vendors, news sources, and credit bureaus. Using such sources, the insurance system 102 may obtain census information, motor vehicle registration and driver information, weather information, property information (such as construction type, construction date, etc.), crime rates, credit histories, financial information, etc. The data may be aggregated data for geographies, industries, or demographics, or it might be specific to current or prospective customers. For example, the third party data may include, without limitation, information about company size, finances, and industry. Illustrative third party text documents include news stories, product information, analyst reports, and documents related to medical treatments, including devices, procedures, and agents.

Data sources 110 are sources of telematics data, i.e., data derived from sensors monitoring property to be insured. The telematics data sources 110 may include monitoring services engaged to monitor property of an insurance customer, systems operated by the insurance customer to monitor the sensors, and sensors that directly output to the insurance carrier system 102. For example, sensor may monitor the condition and/or use of individual or fleets of vehicles, insured property, and goods, or the condition and/or location of individuals. For example, with respect to automobile insurance, telematics data may include, without limitation, speed, location, acceleration, deceleration, environmental conditions (e.g., presence of icy roads or precipitation), tire pressure, and engine use time. For insured structures, the data may include, without limitation, temperature, humidity, alarm system status, smoke alarm status, and air quality. For individuals, telematics data might include, without limitation, blood pressure and pulse. For insured goods, the data may include, without limitation, the location of the goods, data related to the handling of the goods, and data related to environment surrounding the goods.

The insurance carrier system 102 communicates with the user systems 104 and 106 and the data sources 108 and 110 over one or a combination of communication networks 112. The communication networks 112 may be wired, wireless, or a combination thereof. They may be publicly accessible, such as the Internet, or part of a private communications network. Preferably, communications over the communication networks 112 are encrypted to protect the privacy of insurance customers.

The user systems 104 and 106 may be any computing device known in the art, such as a desktop computer, laptop computer, or personal digital assistant capable of networked communication and having a microprocessor capable of executing the user interfaces described herein. In particular, the user systems 104 and 106 include software for providing a user interface to the respective agent or insurance customer.

For the agent system 104, the software may include a thin or thick client, or it may take the form of browser executable code for providing a user interface via a standard Internet browser software application. For the insurance customer system 106, the software preferably takes the form of browser executable code for providing a user interface via a standard Internet browser software application. The user interfaces provided by the user systems 104 and 106 are described further below. In addition to communicating with agent systems 104 and user systems 106, the insurance system 102 may also received insurance requests from insurance aggregators, brokers, an e-agent interface and/or Internet portals intended for identifying insurance coverage for customers. In some embodiments, these alternative providers of an insurance requests are associated with one or more agents.

The insurance carrier system 102 includes a plurality of application servers 114, a plurality of load balancing proxy servers 116, a data warehouse 118, a business logic processor 120, and one or more carrier terminals 122. These computing devices are connected by a local area network 124.

The application servers 114 are responsible for interacting with the user systems 104 and 106. For example, the application servers 114 include software for generating web pages for communication to the user systems 104 and 106. These web pages serve as user interfaces for the insurance agent and insurance customer, respectively, to interact with the insurance carrier system 102. Alternatively, or in addition, one or more of the application servers 114 may be configured to communicate with thin or thick clients operating on the agent system 104. The load balancing proxy servers 116 operate to distribute the load among application servers 114.

The data warehouse 118 is the main electronic depository of the insurance company's current and historical data. The data warehouse 118 includes one or more interrelated databases that store information relevant to insurance data analysis. The interrelated databases store both structured and unstructured data. In one implementation, one or more of the interrelated databases store electronic copies of insurance forms, either in an image format or a text-searchable format keyed to a customer or claim. Other forms of unstructured data stored in the data warehouse 118 include, without limitation, audio files storing insurance customer telephone conversations, transcripts of such conversations, image files, e.g., documenting the condition of insured property, and video files. Other databases in the interrelated databases store data, for example, in a relational database, in various data fields keyed to various identifiers, such as, without limitation, customer, data source, geography, or business identifier (such as Standard Industry Classification Code). The information stored in the data warehouse 118 is obtained through communications with customers, agents, vendors, and third party data providers and investigators.

The business logic processor 120 includes one or more computing devices tasked with carrying out the primary insurance decision analyses carried out by the insurance company. In particular, the business logic processor 120 is configured to make suggestions of policy parameters to potential customers and current customers seeking new coverage or renewal of existing coverage. The business logic processor 120 is further configured to determine a workflow to be followed by the insurance company to evaluate the customer for such coverage, and to determine a corresponding price. These determinations are preferably made using one or more computerized predictive models. The business logic processor 120 is described further in relation to FIGS. 3-6.

The insurance carrier terminals 122 provide various user interfaces to insurance carrier employees to interact with the business logic processor 120. The interfaces include, without limitation, interfaces to add new insurance coverages and coverage options to the insurance carrier system 102 and to adjust the predictive models utilized by the business logic processor 120. Such interfaces may be integrated into one or more websites for managing the insurance carrier system 102 presented by the application servers 114, or they may be integrated into thin or thick software clients. The carrier terminals 122 can be any computing devices suitable for carrying out the processes described above, including personal computers, lap top computers, personal digital computers, and other computing devices with general purpose processors.

Figure 2:
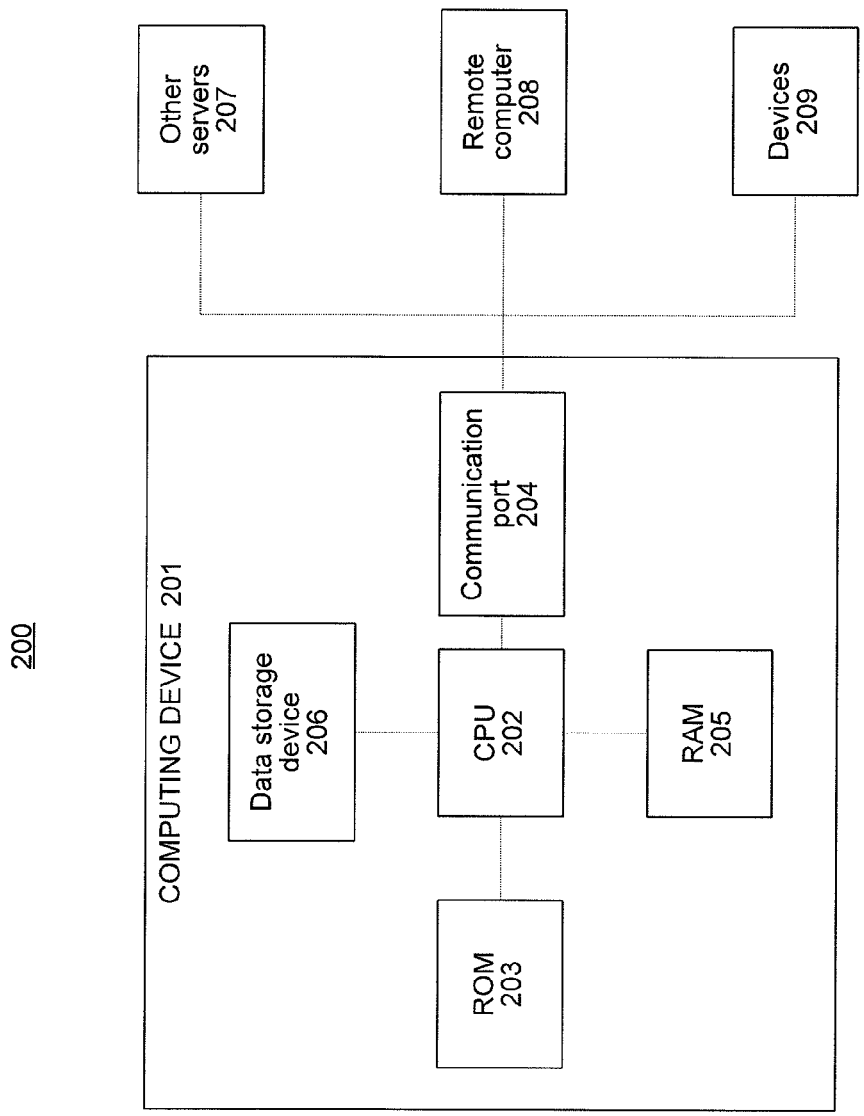
FIG. 2 is a block diagram of a computer architecture suitable for implementing various computing devices depicted in the system of FIG. 1.

FIG. 2 is a block diagram of a computer architecture 200 suitable for implementing various computing devices 201 incorporated into the system 100, including, for example, the application servers 114 and the business logic processor 120.

Computing device 201 comprises at least one central processing unit (CPU) 202, at least one read-only memory (ROM) 203, at least one communication port or hub 204, at least one random access memory (RAM) 205, and one or more databases or data storage devices 206. All of these later elements are in communication with the CPU 202 to facilitate the operation of the computing device 201. The computing device 201 may be configured in many different ways. For example, computing device 201 may be a conventional standalone server computer or alternatively, the function of server may be distributed across multiple computing systems and architectures.

Computing device 201 may be configured in a distributed architecture, wherein databases and processors are housed in separate units or locations. Some such servers perform primary processing functions and contain at a minimum, a general controller or a processor 202, a ROM 203, and a RAM 205. In such an embodiment, each of these servers is attached to a communications hub or port 204 that serves as a primary communication link with other servers 207, client or user computers 208 and other related devices 209. The communications hub or port 204 may have minimal processing capability itself, serving primarily as a communications router. A variety of communications protocols may be part of the system, including but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors. The CPU 202 is in communication with the communication port 204 through which the CPU 202 communicates with other devices such as other servers 207, user terminals 208, or devices 209. The communication port 204 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 206. The data storage device 206 may comprise an appropriate combination of magnetic, optical and/or semiconductor memory, and may include, for example, RAM, ROM, flash drive, an optical disc such as a compact disc and/or a hard disk or drive. The CPU 202 and the data storage device 206 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 202 may be connected to the data storage device 206 via the communication port 204.

The data storage device 206 may store, for example, (i) a program (e.g., computer program code and/or a computer program product) adapted to direct the CPU 202 in accordance with the present invention, and particularly in accordance with the processes described in detail hereinafter with regard to the CPU 202; (ii) databases adapted to store information that may be utilized to store information required by the program. Suitable databases include data warehouse 118 of FIG. 1.

The program may be stored, for example, in a compressed, an uncompiled and/or an encrypted format, and may include computer program code. The instructions of the program may be read into a main memory of the processor from a computer-readable medium other than the data storage device 206, such as from a ROM 203 or from a RAM 205. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as responding to insurance requests, including suggesting insurance policy coverage parameters, calculating a corresponding premium price, and determining a corresponding workflow component for processing the insurance request using the suggested parameters. The program also may include program elements such as an operating system, a database management system and "device drivers" that allow the processor to interface with computer peripheral devices (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer 208. The remote computer 208 can load the instructions into its dynamic memory and send the instructions over an Ethernet connection, cable line, or even telephone line using a modem. A communications device 204 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As previously discussed with reference to FIG. 1, servers may also interact and/or control one or more user devices 209, such as displays and printers, or remote computers 208 such as, agent system 104, customer system 106, and carrier terminals 122. These systems and terminals may include any one or a combination of a personal computer, a laptop, a personal digital assistant, a mouse, a keyboard, a computer display, a touch screen, LCD, voice recognition software, or other input/output devices required to implement the above functionality.

Figure 3:
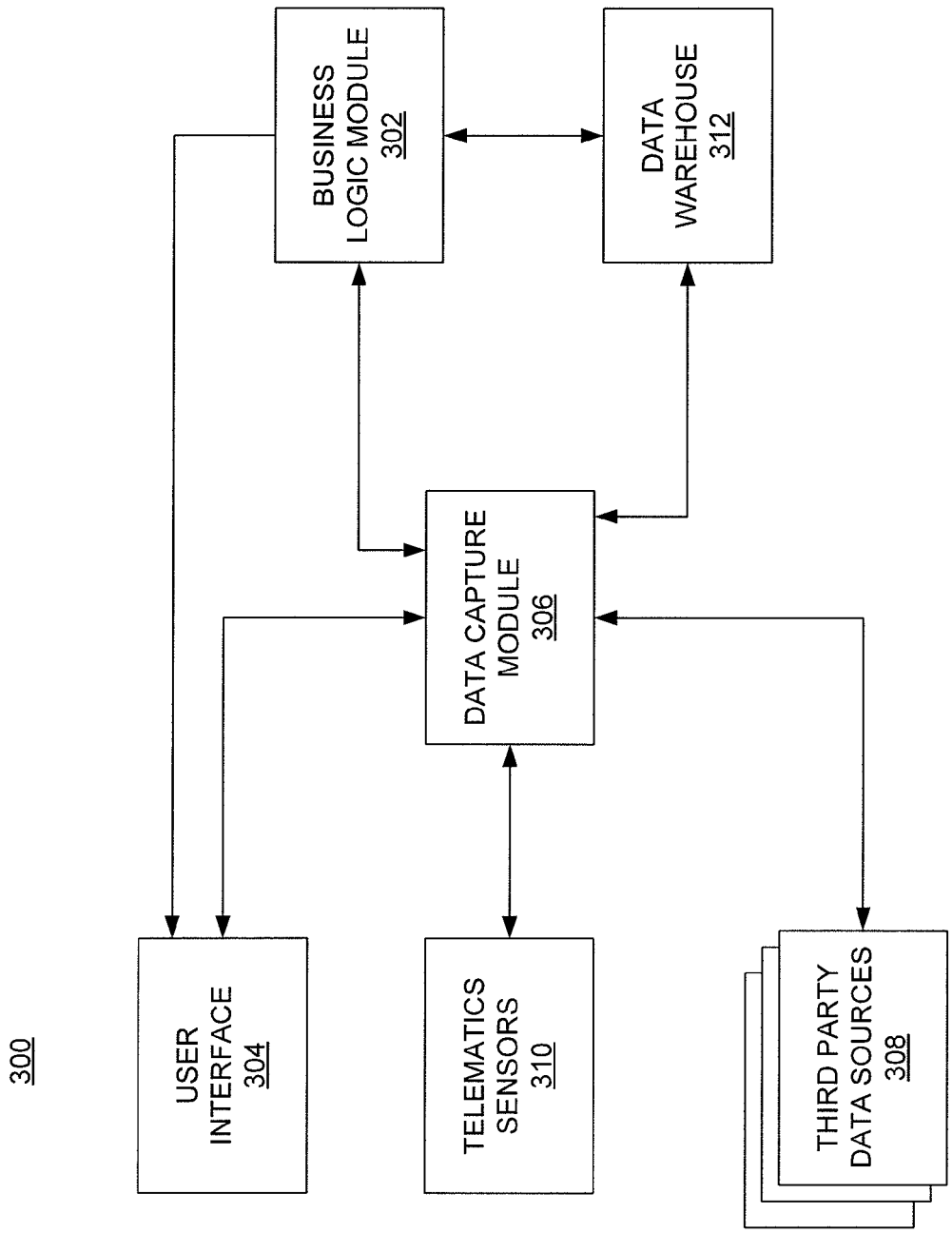
FIG. 3 is a functional block diagram of a system for insurance request handling, according to an illustrative embodiment of the invention.

FIG. 3 is a functional block diagram of a system for insurance request handling 300, according to an illustrative embodiment of the invention. The system 300 includes a business logic module 302 (described further in FIG. 4) for determining one or more suggested sets of coverage parameters to present to a user that enters an insurance request via a user interface 304. The business logic module 302 is also configured to determine a corresponding price and underwriting workflow for the sets of suggested policy parameters. A data capture module 306 (described further in relation to FIG. 6) manages the process of obtaining data for the business logic module 302 from the user interface 304, third party data sources 308 (e.g., data sources 108), sources of telematics sensor data 310 (e.g., data sources 110), and a data warehouse 312 (e.g., data warehouse 118) of the insurance company.

As used herein, a "module" may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. In addition, entire modules, or portions thereof, may also be implemented in programmable hardware devices such as field programmable gate arrays, programmable array logic, programmable logic devices or the like or as hardwired integrated circuits.

Figure 4:
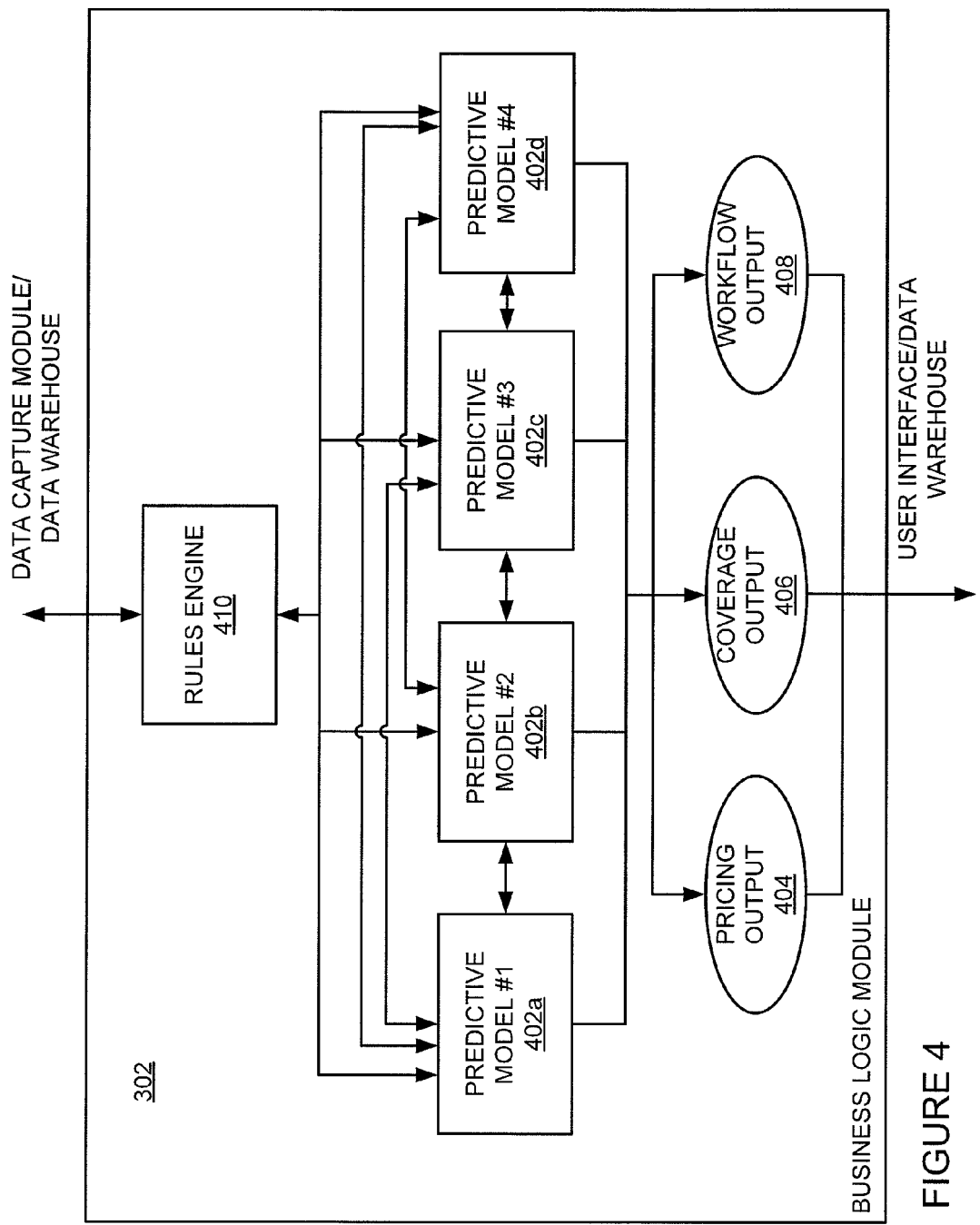
FIG. 4 is a block diagram of a business logic module, depicted in FIG. 3, according to an illustrative embodiment of the invention.

FIG. 4 is a block diagram of the business logic module 302, depicted in FIG. 3, according to an illustrative embodiment of the invention. The business logic module 302 includes several, in this example, four, predictive models 402a-402d (generally "predictive models 402"). The inclusion of four predictive models is merely illustrative in nature. In various implementations, the business logic module may include as few as one predictive model 402 or more than four predictive models 402.

A predictive model 402 preferably takes into account a large number of parameters. The predictive models 402, in various implementation, include one or more of neural networks, Bayesian networks (such as Hidden Markov models), expert systems, decision trees, collections of decision trees, support vector machines, or other systems known in the art for addressing problems with large numbers of variables. Preferably, the predictive models 402 are trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems. The parameters can be selected from any of the structured data parameters stored in the data warehouse 118, whether the parameters were input into the system originally in a structured format or whether they were extracted from previously unstructured text.

Business logic module 302 includes an underwriting workflow model 402a, a coverage recommendation model 402b, a pricing model 402c, and a fraud detection model 402d. The predictive models 402a-402d result in the output of an estimated policy price 404, a suggested set of policy parameters 406, and a required underwriting workflow component 408.

The underwriting workflow model 402a determines one or more underwriting workflow components that will be required to extend a given set of coverages at a particular price to a customer. Coverages for more homogenous industries require less underwriting than coverages for businesses that entail greater individual risk variation. Underwriting work flow components may include, without limitation, a loss-control investigation, review by a human underwriter, verification of data with documentary evidence, automatic issuance/declination of a policy, flagging of additional risk characteristics requiring further exposure development, identification of unique risks that warrant special attention (e.g. review by home office staff or manuscript endorsements), and indication of underwriting authority levels. In addition, or in the alternative, the underwriting workflow model 402a may output that no separate underwriting steps are required and that the proposed coverage may be extended without further review.

The coverage recommendation model 402b outputs a suggested set of policy parameters in response to the insurance system 102 receiving an application for a new or renewal policy or an insurance quote request. The policy parameters include, without limitation, suggested coverages and riders, and associated limits and deductibles. The set of policy parameters is derived for the customer based on historical coverage selections and claims histories of other customers having similar attributes, similar claims histories, and similar risk profiles as the applicant for the new or renewal policy. In one implementation, the coverage recommendation model 402b determines a set of suggested policy parameters dynamically each time a new or renewal policy is requested or a quote request is received. In another implementation, on a periodic basis, the coverage recommendation model 402b is executed to generate a set of suggested policies. Then, when an applicant requests a new or renewal policy or a quote there for, the coverage recommendation model 402b recommends a policy from the previously generated set of policies that most closely matches the profile of the applicant. In both cases, a user of the system, for example, an insurance agent or the customer, can then change the suggested policy parameters to personalize the policy to their own preferences. In one implementation, a policy having a suggested set of policy parameters is treated preferentially by the underwriting business logic in comparison to manually generated policies or modified suggested policies.

The pricing model 402c outputs a price associated with a given set of coverage parameters, underwriting workflow components, and customer attributes. The output may be an actual premium associated with the input, for example, if no manual underwriting is required. Alternatively, the output may be an estimated premium that may vary based on the results of any further underwriting workflow components.

The fraud detection model 402d outputs a value corresponding to the likelihood that data entered into the insurance system 102 is fraudulent. The value may be a likelihood score, a probability, or a qualitative or quantitative classification, e.g., high, medium, or low, top 30%, middle 30%, or bottom 40% of insurance requests ranked based on their respective likelihoods of fraud.

In one implementation, the predictive models 402a-402d operate independently from one another, using only the input received from the data capture module 306 and the data warehouse 312. In the illustrative implementation, the outputs of one or more of the predictive models 402a-402d serve as inputs to others of the predictive models 402a-402d. In a simple case, the output of the fraud detection model 402d, which includes a likelihood that the requester of insurance is submitting fraudulent information, serves as an input to the underwriting workflow model 402a. In response to the fraud detection model 402d outputting an elevated likelihood of fraud, the underwriting workflow model 402a is more likely to output a more stringent underwriting process. In this case, the fraud detection model 402d and the underwriting workflow model 402a, can be executed serially.

In contrast, in a more complex implementation, two or more predictive models may execute in a loop fashion. For example, the output of the coverage recommendation model 402b serves as an input to the pricing model 402c, and the output of the pricing model serves as an input to the coverage recommendation model 402b. The models 402b and 402c execute one after another until their outputs across iterations stabilizes, until the variation in the outputs exhibits desirably small changes, or for a predetermined number of iterations.

For example, in addition to price (i.e., the output of pricing model 402c), the coverage recommendation model 402b includes the following input parameters obtained by the data capture module 306: customer size, customer annual revenues, customer assets, business type identifier (e.g., an SIC code), and claims history. Based on the type of business the customer participates in and the customer's claims history, the coverage recommendation model 402b might recommend a first set of coverages if price were not an option. However, as the amount of insurance a customer is capable and willing to pay will vary based on its revenues and the assets at risk, a coverage recommendation can be improved if price is considered along with these and the other parameters described above. Thus, after an initial set of recommended coverage parameters is determined by the coverage recommendation model 402b, the output set of coverage parameters is processed along with the data capture module 306 provided parameters to determine a price corresponding to extending such coverage to the particular customer. The price output by the pricing model 402c is then re-input into the coverage recommendation model 402b. Depending on the price, the coverage recommendation model may vary its output to recommend additional coverages, fewer coverages, different deductibles and liability limits, and/or different exclusions. The subsequent recommended set of coverages is input into the pricing model 402c to determine an updated price. The process continues for a predetermined number of iterations or until the output of the coverage recommendation model 402b or the pricing model 402c stabilizes.

In an alternative implementation, the coverage recommendation model 402b outputs a plurality of sets of recommended coverage parameters along with corresponding scores. Each of the recommended coverage sets is then processed in a loop fashion with the pricing model 402c to tune the parameters of each respective set of coverage parameters. In still another embodiment, the processing loop also includes the underwriting workflow model 402a, to determine the appropriate underwriting workflow for each recommended set of coverages and corresponding price.

Other suitable parameters for processing by the predictive models 402a-402c include, without limitation, location, desired premium range, number of employees, property to be insured, value of property to be insured, products, regulatory regime, number of insurance request resubmissions (as described below), agent identifier, agent profitability history, agent data quality history, employee driving records, wage levels of employees, proximity to certain geographic characteristics, business demographics, and fit of specific operations of a business within a more general classification.

Figure 5:
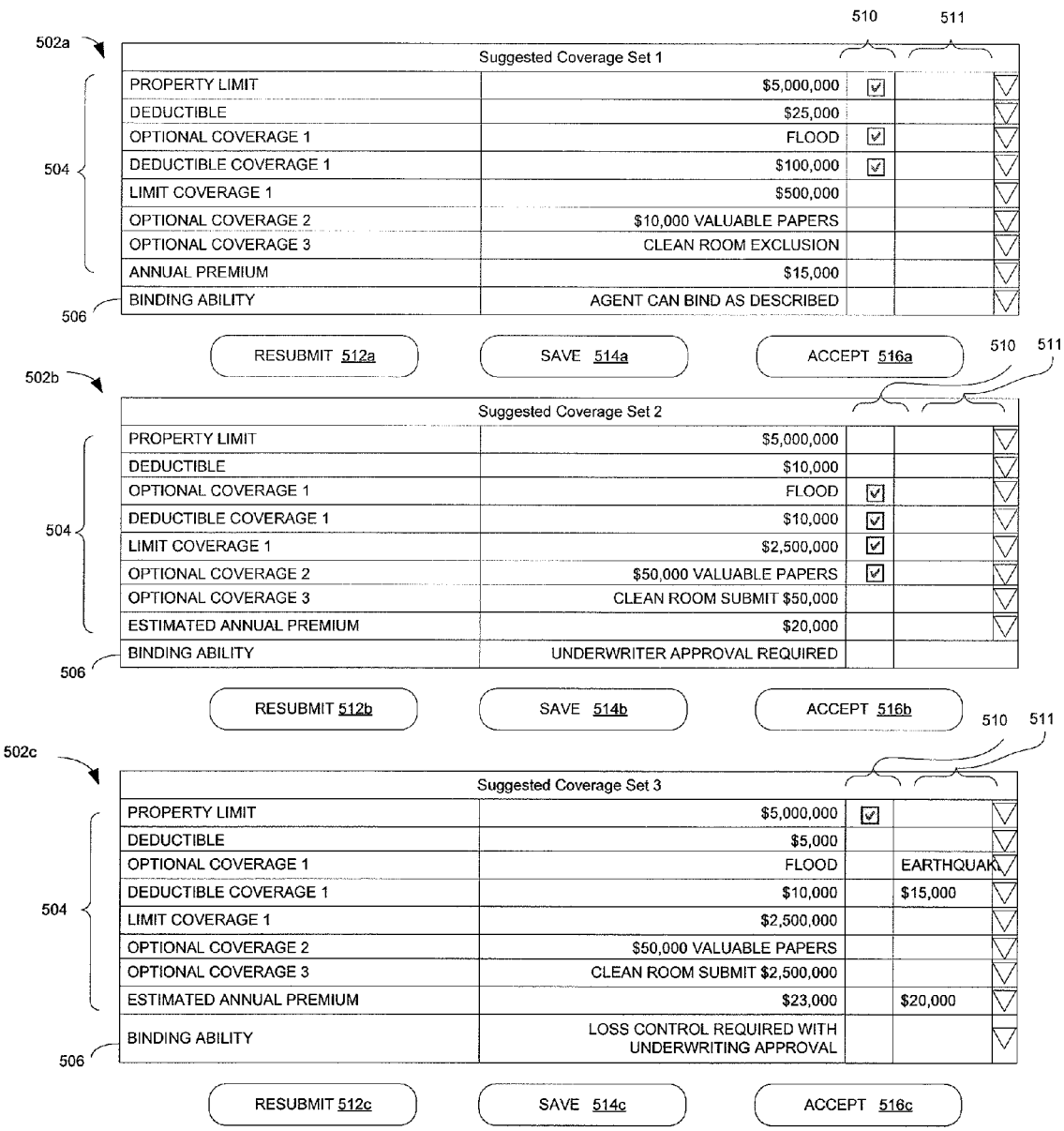
FIG. 5 is an illustrative screen shot of the output of the business logic module of FIG. 4.
Figure 6:
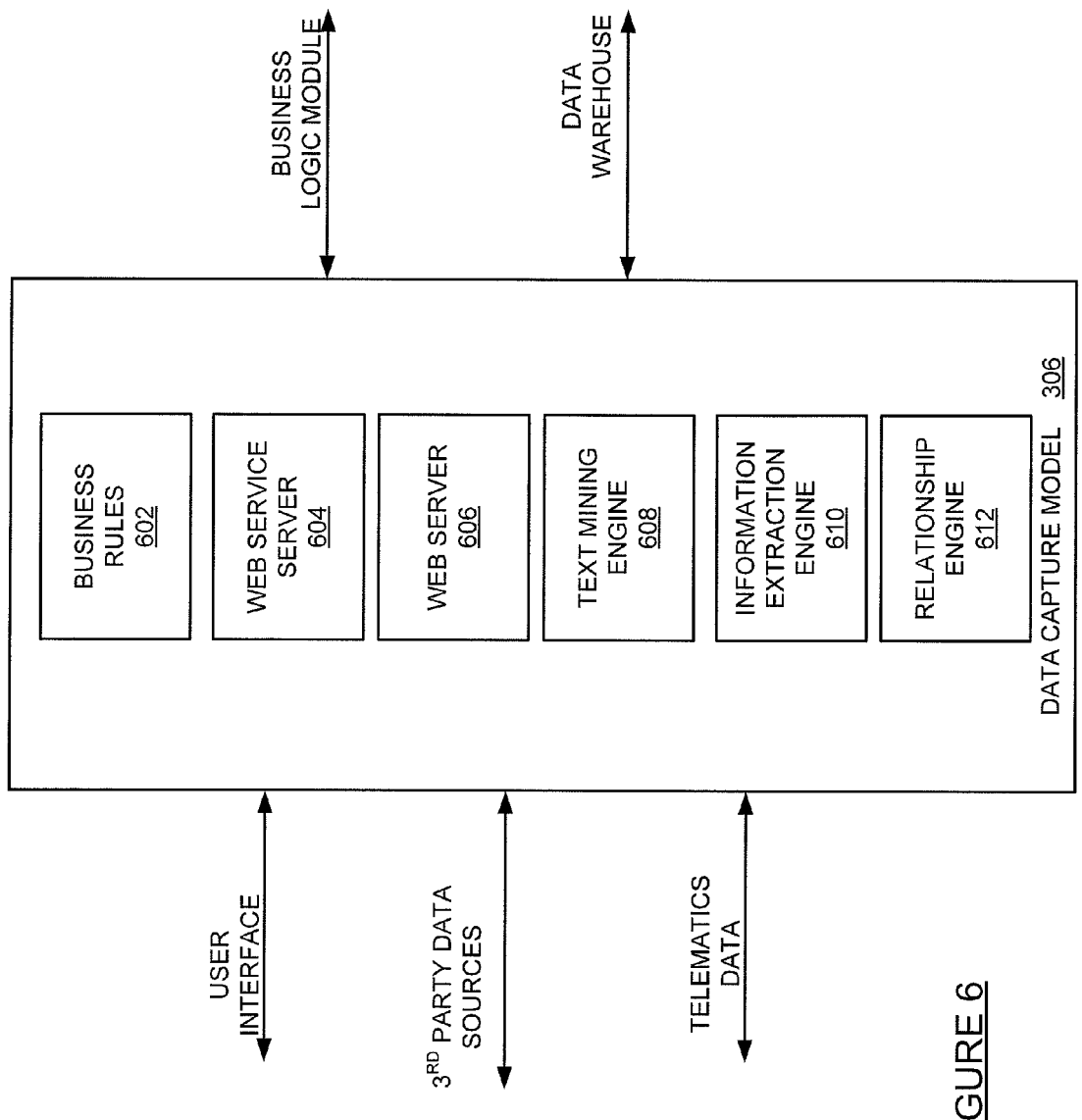
FIG. 6 is a block diagram of a data capture module of FIG. 3, according to an illustrative embodiment of the invention.

The final outputs of the model are output to the user interface 304 for review. FIG. 5 is an illustrative screen shot 500 of the output of the business logic module 302. The screen shot 500 includes three recommended coverage sets 502a, 502b, and 502c (generally "recommended coverage sets 502"). Each recommended coverage set 502 includes a list of coverage parameters 504, including a premium, and a corresponding underwriting workflow component 506a-506c (generally "underwriting workflow component 506"). For example, the first recommended coverage 502a requires no additional underwriting to complete the underwriting of the application. In contrast, the second recommended coverage set 502b requires human underwriting review to complete the underwriting of the application. The presented premium, in cases in which some additional underwriting is required, may only be a premium estimate, as the results of the underwriting may change based on the results of carrying out the required underwriting workflow component 506.

The user interface screen shot 500 also includes fields 510 for each recommended coverage set 502a for a user to accept a presented parameter. For presented parameters the user does not wish to accept, the user may select an alternative using drop down boxes 511 or may leave the parameter field as a variable. After the user is finished adjusting the parameters, the user may select a re-submit button 512a-512c corresponding to the respective recommended coverage set 502a-502c. The revisions are then output back to the business logic module 302 through the data capture module 306. The predictive models 402a-402d of the business logic module 302 re-execute using the newly submitted data in addition to prior submitted data. Manually revised parameters are considered fixed, or in some cases fuzzy, criteria by the models 402, and are not varied or are only minimally varied during the re-execution process. For example, if the user modifies a price corresponding to a suggested set of parameters, the models 402 consider the modified price a fixed or fuzzy threshold and will iterate until they find one or more sets of coverage parameters and underwriting workflows that has a price that is near, at, or below that threshold. If after a predetermine number of iterations, no such set of coverages and underwriting workflows are identified, the request is denied. Similarly, in addition, or in the alternative, a user may confirm the selection of a particular coverage, deductible, coverage limit, and/or underwriting workflow component prior to reprocessing by the business logic module 302.

After reviewing the recommended coverage parameter sets 502a-502c, the user may save one or more of the recommended coverage sets 502a-502c by selecting corresponding save buttons 514a-514c. In addition, a user may accept a recommended coverage set 502a-502c to submit an application for insurance having the identified parameters by selecting a corresponding accept button 516a-516c. Upon acceptance, depending on the desired underwriting workflow component 506, various steps may be automatically initiated. For example, upon selection of accept button 516a, for which no additional underwriting is required, the insurance system binds the customer to a policy with the presented parameters. Upon selection of accept buttons 516b or 516c, the insurance request is automatically forwarded to an underwriting system for assigning personnel to and scheduling manual underwriting review and/or loss control investigations. While the illustrative screen shot 500 only includes three suggested parameter sets 502a-502c, alternative user interface 304 implementations may present fewer or a larger number of suggested parameter sets 502 to a user without departing from the scope of the invention.

Referring back to FIG. 4, the business logic module also includes a rules engine 410. The rules engine 410, preferably a software module, routes data from the data capture module 306 and/or the data warehouse 312 to the appropriate predictive models. The rules engine 410 includes an expert system trained to determine the parameters needed for proper execution of each of the respective models 402. In response to the rules engine 410 receiving an insurance request with insufficient data for the predictive models 402 to execute properly, the rules engine 410 sends a message to the data capture module 306 to retrieve the required data. In an alternative embodiment, one or more of the predictive models 402 is configured to transmit messages to the rules engine 410 to obtain additional data or verify previously received data in response to a determination by the model 402 that the data upon which it is executing is either insufficient or likely includes an error.

Referring back to FIGS. 1 and 3, FIG. 6 is a block diagram of a data capture module 306, according to an illustrative embodiment of the invention. The primary functions of the data capture module 306 are to identify the appropriate sources for data parameters required by the business logic module, obtain the required data, and forward the data to the business logic module 306 for processing. This functionality may be implemented across the business logic processor 120 and one or more of the application servers 114. The source identification logic is incorporated into a set of business rules 602 that associates data parameters with one or more data sources, including user interface 304 users, third party data sources 108, telematics data providers 110, and the data warehouse 118/312. The business rules 602 also include rules used to convert obtained data into the format used by the predictive models for processing.

For data to be obtained from the third party data sources 108 and telematics data providers 110, in one implementation, the data capture module 305 includes a web services server 604 executing one or more web services for automatically querying and obtaining query responses from remote servers operated by the third party data sources 108 and telematics data providers 110. In addition, or in the alternative, the web services server 604 includes a web crawling application to identify relevant information from the broader World Wide Web.

For data to be obtained from user interface 304 users, the data capture module includes a web server 606 for generating web pages to serve to agent systems 104 or customer systems 106 and to receive data therefrom. The web pages may be implemented in part in HTML, SHTML, AJAX, XML, JAVA, MACROMEDIA FLASH, or other web programming or scripting language.

In one implementation, the questions displayed in the web page output by the web server 606 to a user via the user interface 304 are determined dynamically at least in part based on direction from the business logic module 302. The business logic module 302 may direct the web server 606 to generate a web having questions dynamically selected based on data reviewed from the data warehouse 118/312, third party data sources 108, telematics data providers 110, and/or based on responses to prior questions. In one particular implementation, the business logic module 302 selects questions to present to the user via the user interface 304 based on information known about the user. For example, if the user is known to be a customer with limited knowledge of insurance, the business logic module 302 directs the web server 606 to generate a web page that presents questions in a first format; whereas when the user is known to be an experienced agent, the questions are presented in a second format. Similarly, the business logic module 302 may select questions to be presented to the user based on prior history of interactions with the user. For example, if the user is an agent with only limited experience selling policies for the company, the business logic module 302 may direct the web server 606 to generate a web page that presents more or different questions than if the user is known to be an experienced agent. Questions may also be selected by the business logic module 302 based on the performance history of policies issued by a particular agent. For example, if polices issued by a given agent historically result in higher than average loss profiles, the business logic module 302 may direct the web server 606 to generate a web page that presents more or different questions to that particular agent.

The data capture module 306 also includes a text mining engine 608, an information extraction engine 610, and a relationship engine 612 for extracting additional data from unstructured data and for making connections between data entered in relation to one insurance request or claim with other insurance requests and claims. The text mining engine 608, information extraction engine 610, and relationship engine 612 may process documents retrieved from the data warehouse 118, documents retrieved from third party data sources, and the free-form text entry fields of insurance forms presented via the user interface 304.

The text mining engine 608 extracts structured data from the unstructured text included in unstructured text documents received or stored by the insurance system 102. The text mining engine 608 includes an optional optical character recognition process to detect text in documents stored in an image format. In one embodiment, the text mining engine 608 includes a non-natural language parser for identifying key words in documents. The key words identified may be based on a predetermined list of words, or they may be identified by analyzing the frequency of the word in the document or a corpus of documents being analyzed. In another implementation, the text mining engine 608 includes a natural language parser for extracting semantic meaning from text in addition to detecting the presence and/or frequency of particular key words. The text mining engine 608 may take on a number of other forms without departing from the scope of the invention.

The information extraction engine 610, in one implementation, is integrated with the text mining engine 608. The information extraction engine 610 identifies names of people, places, and things in documents and identifies semantic relationships between people and objects. The output of the text mining engine 608 and the information extraction engine 610 may be stored in the data warehouse 118/312 or may be output directly to the business logic module 302.

The relationship engine 612 analyzes data stored in the data warehouse 118/312 to draw linkages between individual datum which may not already be logically linked. The linked data may be related to a single customer or claim, or they may be related to different customers or claims. For example, in handling claims for a first customer, the insurance company learns that a particular individual owned a company that experienced numerous claims. The fact that this individual is associated with a negative loss history is stored in the data warehouse. In a later insurance request from a new customer, the insurance company learns that the new business is owned by that same individual without being directly informed that the individual was associated with the negative loss history. By processing the information by the relationship engine 612, the individual will be linked to their loss history, and the data stored for the new customer will be updated in the data warehouse 118 accordingly.

The relationship engine 612 can also be employed to detect discrepancies in data received from multiple sources. For example, if in a form a customer indicates that an insured property is of a first size, and a third party data source 108, for example, a real estate information database, indicates that the property is of a second size, the relationship engine 612 can instruct the data capture module 306 to obtain further information to verify the actual size or to require investigation of the facts during underwriting. Such discrepancies may be output to the fraud detection model 402*d* in the business logic module 302. Alternatively, the relationship engine 612 can issue an alert. Similarly, in analyzing automobile accidents, the relationship engine can detect discrepancies between written accounts of the accident from different parties and data collected from telematics data sources 110 monitoring one or more of vehicles involved in the accident.

Preferably, the insurance decision making system is dynamic in nature. That is, based on information learned from analyses carried out by the predictive models 402 and the relationship engine 612, the text mining engine 608, the information extraction engine 610, the relationship engine 612, and the predictive models 402 are updated to reflect relevant information. For example, the predictive models can be used to detect trends in input data. For example, by analyzing extracted text in relation to outcomes, the predictive models can determine new structured parameters to include in an analysis and/or new weights to apply to previously known parameters. In addition, as new actual data is collected, for example, the actual losses associated with a particular policy are experienced, the system can be retrained with the new outcome data to refine its analysis capabilities. In one implementation, the system is retrained on a monthly basis. In other embodiments, the system is trained on a weekly, quarterly, and annual basis. In another embodiment, the system is retrained continuously.

Figure 7:
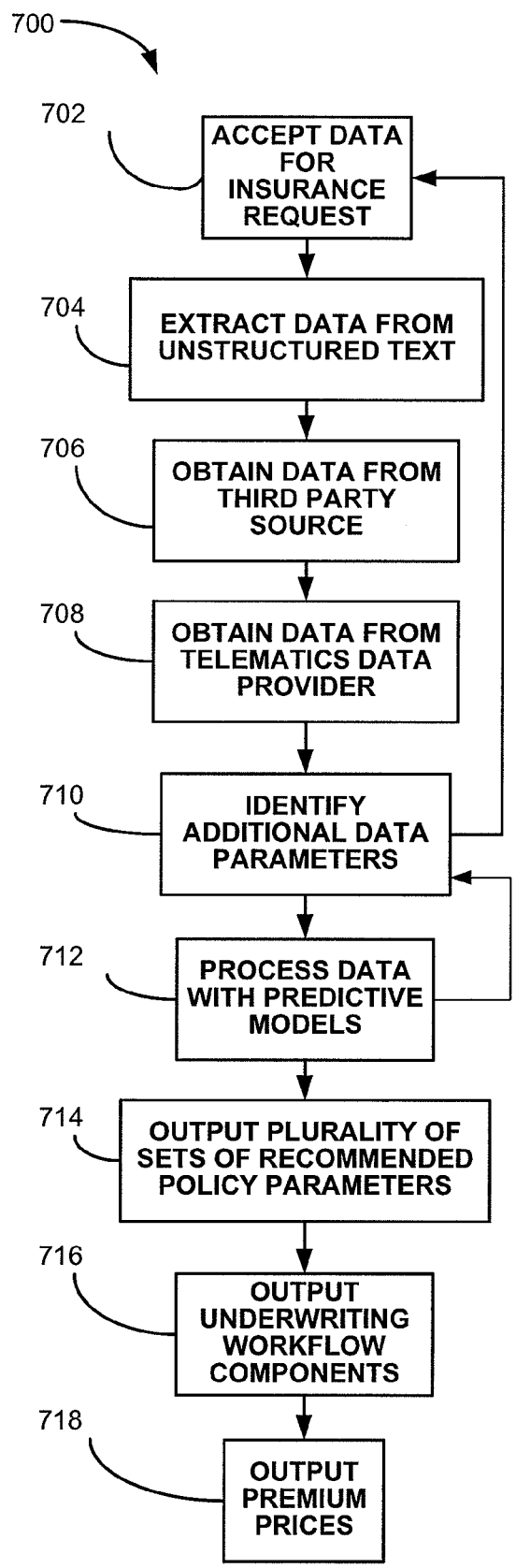
FIG. 7 is a flow chart of a method for handling an insurance request, according to an illustrative embodiment of the invention.

FIG. 7 is a flow chart of a method 700 for handling an insurance request, according to an illustrative embodiment of the invention. As mentioned above, an insurance request may include a request for new coverage, additional coverage, renewal coverage, or a quote for any of the above. The method begins with accepting data from a user related to the insurance request via a user interface (step 702). The user may be an insurance agent or a customer.

Next, additional data is obtained to support the handling of the insurance request (steps 702-708). Each of the following steps is optional. At step 704, structured data is extracted from unstructured text using a text mining application. This step may also include extracting information from the text using an information extraction application. The unstructured text may be received via the user interface, from databases operated by the insurance company, such as the data warehouse 118, or third party data sources. At step 706, data is collected from a third data source as those described above in relation to third party data sources 108. At step 708, data is collected from providers of telematics data 110.

Next, the method 700 includes identifying parameters for which no, little, suspect, or otherwise inadequate data was provided that would benefit the proper execution of the handling process (step 710). If any such parameters are identified, the data acquisition steps 702-708 are repeated to obtain data for the identified parameters. If no parameters are identified at step 710, the obtained data is processed using predictive models (step 712). Preferably, the output of a first predictive model serves as an input to a second predictive model. In addition, an output of the second predictive model also serves as an input to the first predictive model. During or after processing, the method may optionally include returning to step 710 to identify if obtaining data for any model data parameters would improve performance of the models.

Based on the processing carried out at step 712, several outputs are provided (steps 714-718). At step 714, one or more sets of suggested policy parameters are output for presentation to the user. At 716, corresponding underwriting workflow components are output in relation to each respective set of suggested policy parameters. Finally, at step 718, corresponding premium prices are also output for presentation to the user via the user interface.

The invention may be embodied in other specific forms without departing from the spirit or essential characteristics thereof. The forgoing embodiments are therefore to be considered in all respects illustrative, rather than limiting of the invention.

What is claimed is:

1. A system for processing an insurance request comprising:
    a user interface for accepting data related to an insurance request from a user; a business logic processor configured to process the accepted data to i) determine a recommended set of policy parameters for an insured, and ii) output the recommended set of policy parameters to the user via the user interface, wherein the business logic processor comprises:
    a computerized coverage recommendation predictive model which is configured to determine and output a policy parameter recommendation based on the accepted data;
    a computerized pricing predictive model which is configured to receive the policy parameter recommendation as an input, determine a price corresponding to an insurance policy including the received policy parameter recommendation based on the accepted data, and output the determined price into the coverage recommendation predictive model; wherein the coverage recommendation predictive model is further configured to determine and output an updated policy parameter recommendation based on the price output by the pricing predictive model, the accepted data, and a previously output policy parameter recommendation.

2. The system of claim 1, comprising a data capture module for extracting input parameters for the computerized coverage recommendation predictive model and computerized pricing predictive model.

3. The system of claim 2, wherein the data capture module comprises a text mining application for extracting structured data from unstructured text.

4. The system of claim 2, wherein the data capture module is configured to obtain data from a third-party data source and output the data to the business logic processor to serve as an input to at least one of the computerized coverage recommendation predictive model and computerized pricing predictive model.

5. The system of claim 2, wherein the data capture module is configured to obtain data from at least one sensor monitoring the use or condition of a property to be insured and output the data to the business processor to serve as an input to at least one of the computerized coverage recommendation predictive model and computerized pricing predictive model.

6. The system of claim 2, wherein the business logic processor comprises a rule engine configured to i) identify parameters of the computerized coverage recommendation predictive model and computerized pricing predictive model for which additional data would improve performance of the respective computerized coverage recommendation predictive model and computerized pricing predictive model and ii) output the identified parameters to at least one of the user interface and the data capture module.

7. The system of claim 1, wherein the business logic processor processes the accepted data to determine and output a workflow component for the insurance request by executing the computerized coverage recommendation predictive model and computerized pricing predictive model.

8. The system of claim 1, wherein the workflow component comprises an underwriting review process step.

9. The system of claim 1, wherein the business logic module processes the accepted data to determine and output a price component for the insurance request by executing the computerized coverage recommendation predictive model and computerized pricing predictive model.

10. The system of claim 1, wherein the business logic processor outputs a plurality of recommended sets of policy parameters to the user via the user interface.

11. The system of claim 10, wherein for each recommended set, the business logic processor determines and outputs at least one of a price component and a workflow component associated with the respective set by executing the computerized coverage recommendation predictive model and computerized pricing predictive model.

12. A method for processing an insurance request comprising:
providing a user interface for accepting data related to an insurance request from a user; processing the insurance request via a business logic processor configured to process the accepted data to i) determine a recommended set of policy parameters for an insured, and ii) output the recommended set of policy parameters to the user via the user interface,
wherein processing the insurance request comprises:
processing the accepted data by a computerized coverage recommendation predictive model configured to determine and output a policy parameter recommendation based on the accepted data;
processing the output policy parameter recommendation by a computerized pricing predictive model which is configured to receive the policy parameter recommendation as an input, determine a price corresponding to an insurance policy including the received policy parameter recommendation based on the accepted data, and output the determined price into the coverage recommendation predictive model;
receiving, by the computerized coverage recommendation predictive model, the determined price;
determining and outputting, by the computerized coverage recommendation predictive model, an updated policy parameter recommendation based on the price output by the computerized pricing predictive model, the accepted data, and a previously output policy parameter recommendation.

13. The method of claim 12, comprising extracting, by a data capture module, input parameters for the computerized coverage recommendation predictive model and computerized pricing predictive model.

14. The method of claim 13, comprising:
obtaining, by the data capture module, data from a third-party data source; and
outputting, by the data capture module, the obtained data to serve as an input to at least one of the computerized coverage recommendation predictive model and computerized pricing predictive model.

15. The method of claim 13, comprising:
obtaining, by the data capture module, data from at least one sensor monitoring the use or condition of a property to be insured, and
outputting, by the data capture module, the obtained data to the business logic processor to serve as an input to at least one of the computerized coverage recommendation predictive model and computerized pricing predictive model.

16. The method of claim 12, comprising extracting, by a text mining application, data from unstructured text and outputting the extracted data to at least one of the computerized coverage recommendation predictive model and computerized pricing predictive model.

17. The method of claim 13, comprising:
identifying, by the business logic processor, parameters of the computerized coverage recommendation predictive model and computerized pricing predictive model for which additional data would improve performance of the respective computerized coverage recommendation predictive model and computerized pricing predictive model, and
outputting, by the business logic processor, the identified parameters to at least one of the user interface and the data capture module.

18. The method of claim 12, comprising processing, by the business logic processor, the accepted data to determine and output a workflow component for the insurance request by executing the computerized coverage recommendation predictive model and computerized pricing predictive model.

19. The method of claim 12, wherein the workflow component comprises an underwriting review process step.

20. The method of claim 12, comprising processing, by the business logic processor, the accepted data to determine and output a price component for the insurance request by executing the computerized coverage recommendation predictive model and computerized pricing predictive model.

21. The method of claim 12, comprising outputting, by the business logic processor, a plurality of recommended sets of policy parameters to the user via the user interface.

22. The method of claim 21, comprising, for each recommended set, determining and outputting, by the business logic processor, at least one of a price component and a workflow component associated with the respective set by executing the computerized coverage recommendation predictive model and computerized pricing predictive model.

23. A computer-readable medium storing computer-executable instructions, which, when executed by a processor, cause the processor to carry out a method of processing an insurance request, the method comprising:

providing a user interface for accepting data related to an insurance request from a user; processing the insurance request via a business logic processor configured to process the accepted data to i) determine a recommended set of policy parameters for an insured, and ii) output the recommended set of policy parameters to the user via the user interface, wherein processing the insurance request comprises:

processing the accepted data by a computerized coverage recommendation predictive model configured to determine and output a policy parameter recommendation based on the accepted data;

processing the output policy parameter recommendation by a computerized pricing predictive model which is configured to receive the policy parameter recommendation as an input, determine a price corresponding to an insurance policy including the received policy parameter recommendation based on the accepted data, and output the determined price into the coverage recommendation predictive model;

receiving, by the computerized coverage recommendation predictive model, the determined price;

determining and outputting, by the computerized coverage recommendation predictive model, an updated policy parameter recommendation based on the price output by the computerized pricing predictive model, the accepted data, and a previously output policy parameter recommendation.

24. The computer readable medium of claim 23, storing instructions, which when executed by the processor, cause the processor to:

identify, by the business logic processor, parameters of the computerized coverage recommendation predictive model and computerized pricing predictive model for which additional data would improve performance of the respective computerized coverage recommendation predictive model and computerized pricing predictive model, and output, by the business logic processor, the identified parameters to at least one of the user interface and a data capture module.

25. The computer readable medium of claim 23, storing instructions, which when executed by the processor, cause the processor to process, by the business logic processor, the accepted data to determine and output a workflow component for the insurance request by executing the computerized coverage recommendation predictive model and computerized pricing predictive model.

26. The computer readable medium of claim 23, storing instructions, which when executed by the processor, cause the processor to process, by the business logic processor, the accepted data to determine and output a price component for the insurance request by executing the computerized coverage recommendation predictive model and computerized pricing predictive model.

27. The computer readable medium of claim 23, storing instructions, which when executed by a processor, cause the processor to output, by the business logic processor, a plurality of recommended sets of policy parameters to the user via the user interface.

28. The computer readable medium of claim 27, storing instructions, which when executed by a processor, cause the processor to, for each recommended set, determine and output, by the business logic processor, at least one of a price component and a workflow component associated with the respective set by executing the computerized coverage recommendation predictive model and computerized pricing predictive model.

* * * * *